United States Patent
Nagasaka et al.

(10) Patent No.: US 6,779,645 B2
(45) Date of Patent: Aug. 24, 2004

(54) PARKING LOCK RELEASING DEVICE

(75) Inventors: Chikao Nagasaka, Aichi (JP); Masaki Hayashi, Aichi (JP); Noriyasu Syamoto, Aichi (JP)

(73) Assignee: Kabushiki Kaisha Tokai Rika Denki Seisakusho, Niwa-Gun (JP)

( * ) Notice: Subject to any disclaimer, the term of this patent is extended or adjusted under 35 U.S.C. 154(b) by 0 days.

(21) Appl. No.: 10/087,595

(22) Filed: Mar. 1, 2002

(65) Prior Publication Data

US 2002/0170800 A1 Nov. 21, 2002

(30) Foreign Application Priority Data

Mar. 1, 2001 (JP) ........................................ 2001-057298

(51) Int. Cl.[7] .............................................. B60K 41/26
(52) U.S. Cl. .................................. 192/219.6; 192/219.4
(58) Field of Search ......................... 192/219.6, 219.4, 192/219.5; 74/335

(56) References Cited

U.S. PATENT DOCUMENTS

| | | | | |
|---|---|---|---|---|
| 4,843,901 A | * | 7/1989 | Peterson et al. ............... | 74/335 |
| 5,094,126 A | * | 3/1992 | Stainton et al. ............... | 74/335 |
| 5,957,806 A | * | 9/1999 | Hirose et al. .................. | 447/79 |
| 6,047,799 A | * | 4/2000 | Ahnert et al. ................. | 74/335 |
| 6,378,393 B1 | * | 4/2002 | Bates ........................... | 74/335 |
| 6,481,556 B1 | * | 11/2002 | Haupt ...................... | 192/219.5 |
| 2002/0084162 A1 | * | 7/2002 | Schafer et al. ........... | 192/219.4 |

FOREIGN PATENT DOCUMENTS

DE 19742573 * 4/1999 ........... F16H/61/36

* cited by examiner

*Primary Examiner*—Charles A. Marmor
(74) *Attorney, Agent, or Firm*—Patterson, Thuente, Skaar & Christensen, P.A.

(57) ABSTRACT

A transmission control device of a vehicle has a shifting body and detects the operating state of the shifting body. The transmission control device shifts the connecting state of the transmission based on the detection result. A parking lock state releasing apparatus for the vehicle includes a releasing switch, which is located in a passenger compartment. An ignition drive device generates gas by causing ignition in response to operation of the releasing switch. The parking lock state of the transmission is changed to the release state using the pressure of the gas.

2 Claims, 5 Drawing Sheets

PARKING LOCK RELEASING DEVICE

BACKGROUND ART

The present invention relates to a parking lock state releasing apparatus that is used in a vehicle with a vehicle transmission control device for shifting the connecting state of the vehicle's transmission through electric control for releasing a parking lock of the transmission when the transmission control device is incapable of controlling the transmission.

Conventionally, a shift-by-wire type vehicle transmission control device has been proposed, which shifts the connecting state of a transmission through electric control. In this type of transmission control device, when a shifting body located in a passenger compartment is operated, the operating state of the shifting body is detected as an electric signal. An actuator for shifting the connecting state of the transmission in response to the detected signal is then operated. This transmission control device makes it unnecessary to provide a mechanical structure, such as a link mechanism, and the transmission is easily minimized. It is thus possible to arrange the shifting body and the accessories in the passenger compartment as desired. This makes the passenger compartment comfortable.

When the transmission is shifted to the parking state (the parking range), a parking lock is activated. More specifically, in the parking state, the transmission engages a parking lock gear, which is located in an output shaft system of the transmission, with a parking lock pole. This mechanically locks the wheels of the vehicle.

However, if the electric controlling of the transmission by the transmission control device is hampered by insufficient battery voltage or other problems when the transmission is in the parking range, the parking lock state of the transmission cannot be changed to the release state. This causes the disadvantage that the vehicle cannot be moved.

The present invention addresses this problem. Accordingly, it is an objective of the present invention to provide a parking lock state releasing apparatus that releases a parking lock state of a transmission even when controlling of the transmission by a vehicle transmission control device is hampered.

SUMMARY OF THE INVENTION

To achieve the foregoing objective, an embodiment of the present invention provides a parking lock state releasing apparatus of a vehicle that has a transmission control device. The transmission control device has a shifting body and detects the operating state of the shifting body. The transmission control device shifts the connecting state of the transmission based on the detection result. The parking lock state releasing apparatus for the vehicle includes a releasing switch, which is located in a passenger compartment. An ignition drive device generates gas by causing ignition response to operation of the releasing switch. The parking lock state of the transmission is changed to the release state using the pressure of the gas.

DETAILED DESCRIPTION OF THE PREFERRED EMBODIMENTS

A first embodiment of the present invention will now be described with reference to FIGS. 1 to 4.

Figure 1:
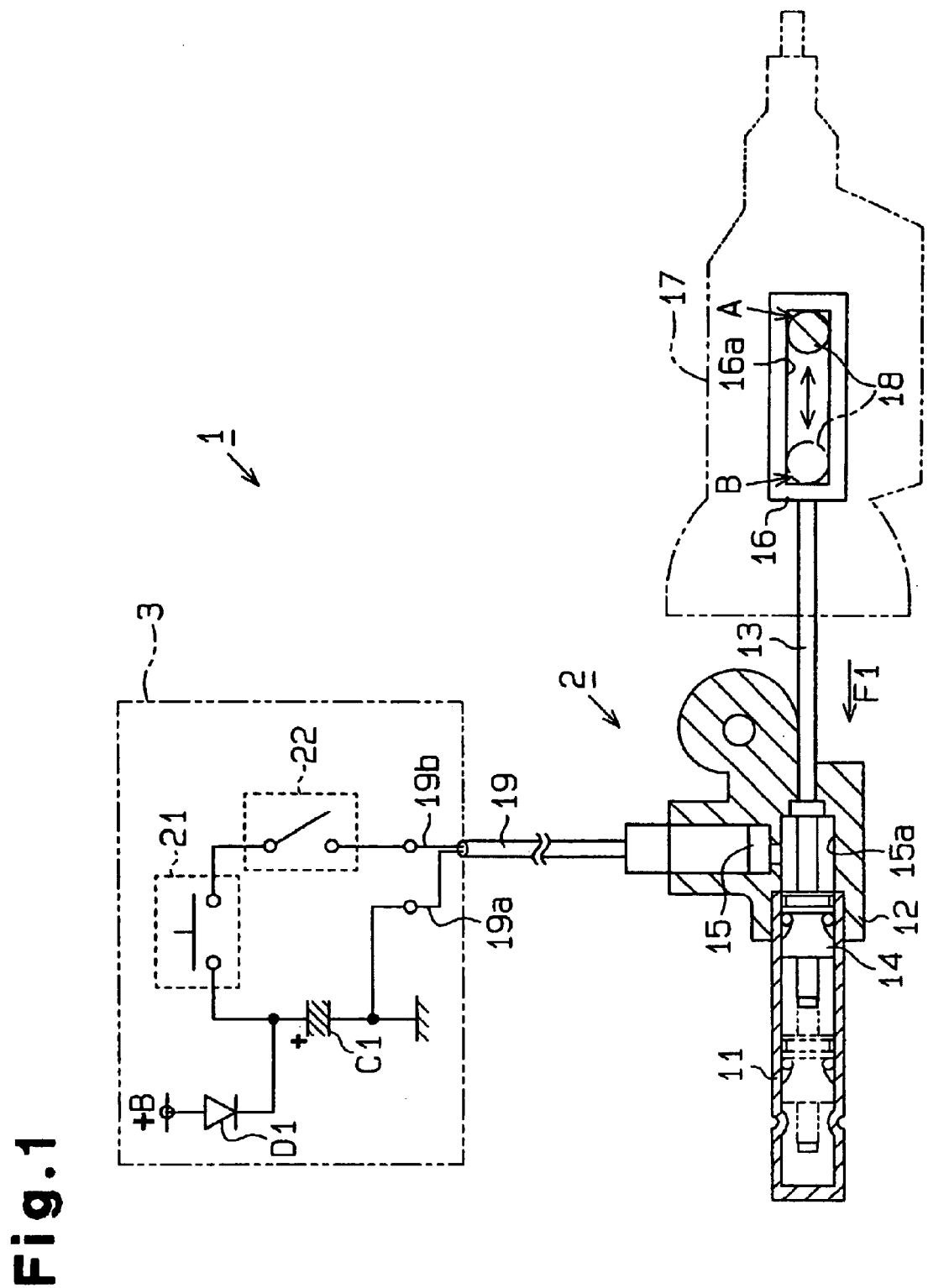
FIG. 1 is a view showing a parking lock state releasing apparatus of a first embodiment of the present invention.

As shown in FIG. 1, a parking lock state releasing apparatus 1 includes an ignition drive device 2 and a driver circuit 3. The ignition drive device 2 has a cylinder 11, a base 12, a rod 13, a piston 14, and a gas generating device 15. The ignition drive device 2 forms a releasing means.

The cylinder 11 has a tubular shape with an open end. The cylinder 11 is coupled to the base 12 with the open end connected to a gas generating chamber 15a, which is formed in the base 12. The piston 14 is connected to an end of the rod 13 and is accommodated in the cylinder 11. In other words, the piston 14 supports the rod 13 with respect to the cylinder 11. The piston 14 is allowed to axially slide, as accommodated in the cylinder 11. Accordingly, when the piston 14 moves, the rod 13 is allowed to project from the cylinder 11 or proceed into the cylinder 11. In this embodiment, the rod 13 is held as projected from the cylinder 11.

A releasing ring 16 is connected to the distal end of the rod 13. The releasing ring 16 has a substantially parallelepiped shape. An elongated hole 16a, which extends axially in the rod 13, is formed in the releasing ring 16. A parking lock member 18, which is formed in an automatic transmission (hereinafter referred to as a "transmission") 17, is received in the elongated hole 16a. The parking lock member 18 is allowed to move in an axial direction of the rod 13. More specifically, the parking lock member 18 is movable between the position A and the position B of FIG. 1.

The parking lock member 18 actuates a parking lock pole (not shown) when the connecting state of a gear train of the transmission 17 corresponds to the parking state (the parking range) P. When actuated by the parking lock member 18, the parking lock pole is engaged with a parking lock gear (not shown), which is located in an output shaft system of the transmission 17. This mechanically locks the wheels of the vehicle. In this embodiment, a parking lock is activated when the parking lock member 18 is located at the position A of FIG. 1. The parking lock state is changed to a release state when the parking lock member 18 is located at the position B of FIG. 1.

The gas generating device 15 is located in the base 12. When the gas generating device 15 is actuated, a pyrotechnic agent, which is retained in the gas generating device 15, is ignited. This generates gas in the gas generating chamber 15a. Thus, during the actuation of the gas generating device 15, the pressure of the gas in the gas generating chamber 15a moves the piston 14 in the cylinder 11, as indicated by the double-dotted chain line of FIG. 1. This moves the rod 13 in the direction indicated by the arrow F1. In other words, the rod 13 proceeds into the cylinder 11 when the gas generating device 15 is actuated. The releasing ring 16 follows the movement of the rod 13 and moves in the direction of the arrow F1. Accordingly, even if the parking lock member 18 is located at the position A, the actuation of the gas generating device 15 causes the releasing ring 16 to switch to the position B. That is, the parking lock state is forcibly changed to the release state when the gas generating device 15 is actuated.

One end of a wire harness 19, which includes two electric wires 19a, 19b, is connected to the gas generating device 15. The driver circuit 3 is connected to the other end of the wire harness 19. The driver circuit 3 includes a releasing switch 21, a permitting switch 22, an electrolytic capacitor C1, and a diode D1.

The anode of the diode D1 is connected to a battery terminal. The cathode of the diode D1 is connected to the positive terminal of the electrolytic capacitor C1 and one end of the releasing switch 21. The negative terminal of the electrolytic capacitor C1 is connected to the first electric wire 19a of the wire harness 19 and is grounded. The other end of the releasing switch 21 is connected to one end of the permitting switch 22. The other end of the permitting switch 22 is connected to the second electric wire 19b of the wire harness 19. In other words, the releasing switch 21, the permitting switch 22, and the electrolytic capacitor C1 are connected in series between the electric wires 19a, 19b.

In the driver circuit 3, the electrolytic capacitor C1 is maintained in a state constantly charged by the power from a battery. When the contact of the releasing switch 21 and the contact of the permitting switch 22 are both closed, the electrolytic capacitor C1 supplies power to the gas generating device 15, thus actuating the gas generating device 15. In other words, as long as the contact of the releasing switch 21 and the contact of the permitting switch 22 are both closed, the power of the electrolytic capacitor C1 actuates the gas generating device 15 even if the battery is out of power (has been completely consumed).

Figure 2:
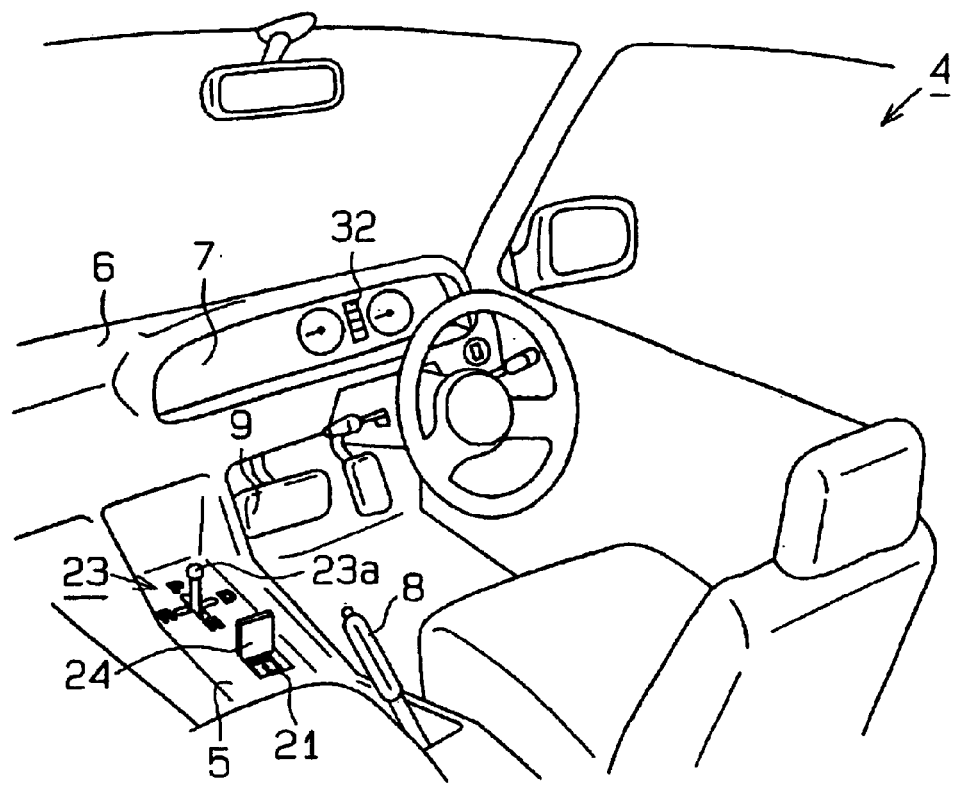
FIG. 2 is a perspective view showing the interior of a passenger compartment of the first embodiment.
Figure 3:
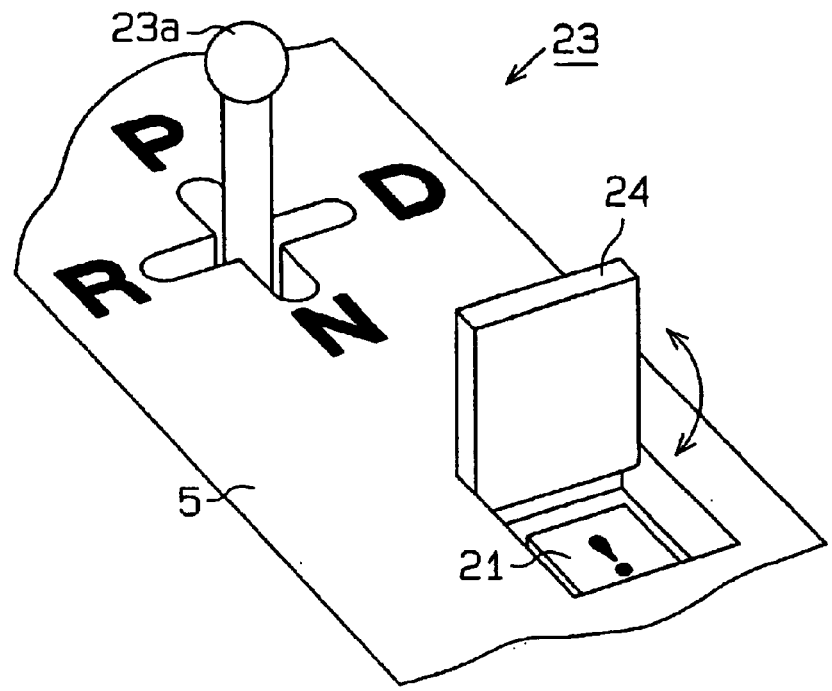
FIG. 3 is an enlarged perspective view showing a portion of the passenger compartment of the first embodiment.

With reference to FIGS. 2 and 3, the releasing switch 21 is located in a center console panel 5 in the passenger compartment of a vehicle 4. More specifically, the releasing switch 21 is a momentary type push-button switch that is located in the vicinity of a shifting body 23, which is formed in the center console panel 5. Referring to FIG. 3, the releasing switch 21 is normally covered by a cover 24. The cover 24 is pivotally supported, as indicated by the arrow in FIG. 3. The releasing switch 21 is exposed when the cover 24 is pivoted. This enables the operator to manipulate the releasing switch 21 in the passenger compartment.

Figure 4:
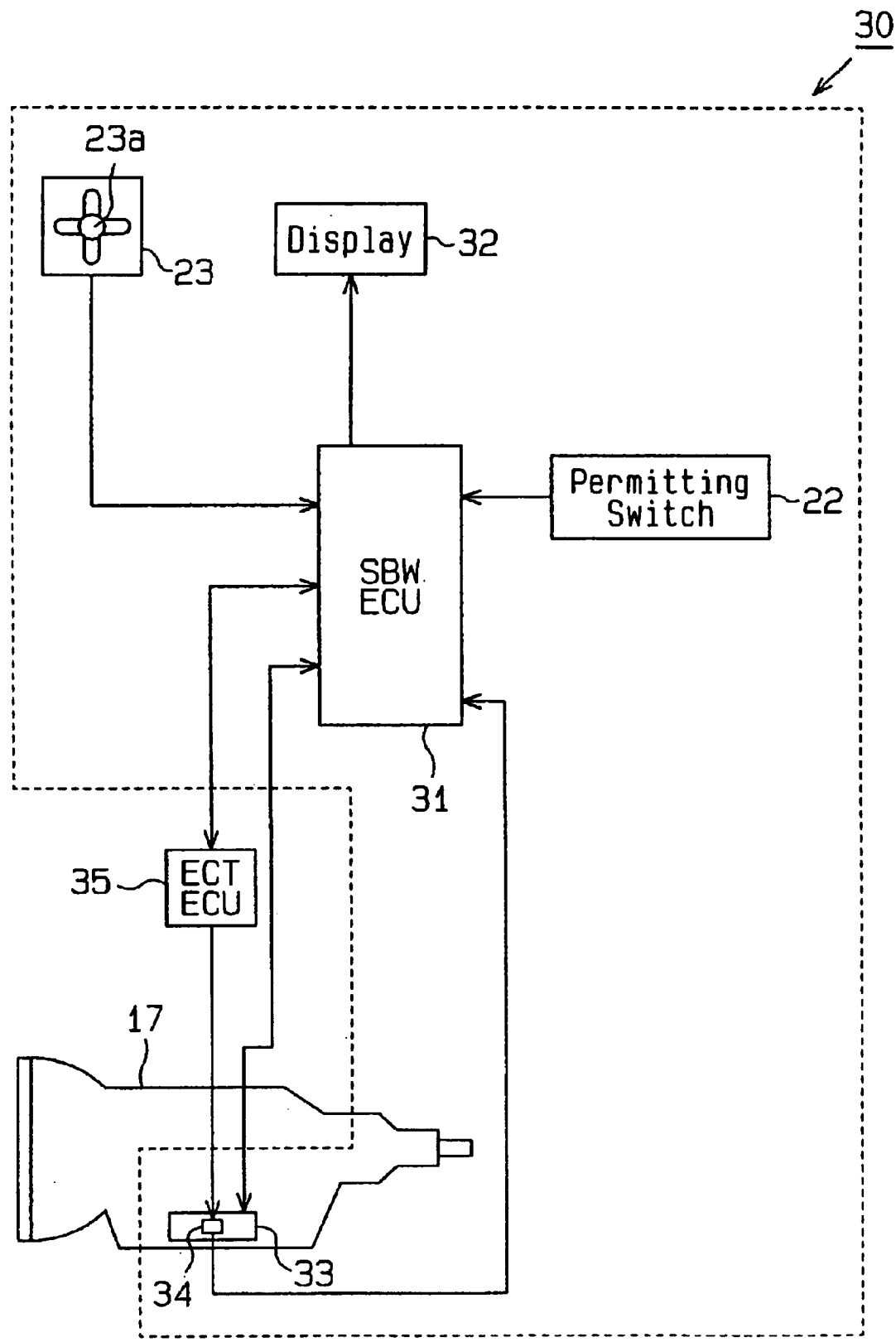
FIG. 4 is a block diagram showing the vehicle transmission control device of the first embodiment.

When a predetermined drive signal is inputted to the permitting switch 22, the permitting switch 22 opens its contact. When the inputting of the drive signal is finished, the permitting switch 22 closes its contact. An electronic control device (SBW-ECU) 31 of a vehicle transmission control device 30, which is shown in FIG. 4, controls outputting of the drive signal to the permitting switch 22. The transmission control device 30 will hereafter be described.

With reference to FIG. 4, the transmission control device 30 includes the permitting switch 22, the shifting body 23, the electronic control device (SBW-ECU) 31, a display 32, a hydraulic actuator 33 for transmission, and a range position detector 34. The permitting switch 22, the shifting body 23, the display 23, the hydraulic actuator 33, and the detector 34 are each electrically connected to the SBW-ECU 31.

With reference to FIGS. 2 and 3, the shifting body 23 has a lever-like manipulator 23a. The shifting body 23 is located in the center console panel 5 such that the manipulator 23a faces upward. The manipulator 23a is allowed to tilt forward, rearward, leftward, or rightward. The manipulator 23a is normally held at a neutral position. In this embodiment, the shifting body 23 is located in the range "P" when the manipulator 23a is tilted forward and the range "N" when the manipulator 23a is tilted rearward. The shifting body 23 is located in the range "R" when the manipulator 23a is tilted toward a passenger seat next to the driver seat. The shifting body 23 is located in the range "D" when the manipulator 23a is tilted toward the driver seat. In other words, the shifting range is switched in accordance with the direction in which the manipulator 23a is tilted.

The display 32 is an indicator that indicates a shift range. As shown in FIG. 2, the display 32 is located in a combination meter 7 of an instrument panel 6. The display 32 displays the currently selected shift range in accordance with a control signal outputted from the SBW-ECU 31.

The hydraulic actuator 33 is a component that forms the transmission 17 and includes non-illustrated electromagnetic control valves, which are controlled by electric signals. Each of the electromagnetic valves controls hydraulic fluid supplied from a hydraulic pump to switch the connecting state of the gear train. The connecting state of the gear train is switched among a neutral state (a neutral range) N, a parking state (a parking range) P, a driving state (a driving range) D, and a reversing state (a reversing range) R. When the connecting state of the gear train corresponds to the parking state P, the hydraulic actuator 33 moves the parking lock member 18 from the position B to the position A, thus causing the parking lock state. Further, when the connecting state of the gear train is switched from the parking state P to a different state (for example, the neutral state N), the hydraulic actuator 33 moves the parking lock member 18 from the position A to the position B, thus releasing the parking lock.

The range position detector 34 is located in the housing of the transmission 17. The range position detector 34 specifically detects the connecting state (P, N, D, R) of the gear train and outputs a detection signal to the SBW-ECU 31.

The SBW-ECU 31 includes a non-illustrated microcomputer. The microcomputer executes a pre-stored control program to control the hydraulic actuator 33 such that the connecting state of the gear train is switched. The SBW-ECU 31 controls the hydraulic actuator 33 depending on an operation signal from the shifting body 23 and a detection signal from the range position detector 34. For example, when the manipulator 23a of the shifting body 23 is tilted to the position "D", the shifting body 23 supplies the SBW-ECU 31 with the operation signal that indicates the current operation mode. In response to the operation signal, the SBW-ECU 31 actuates the hydraulic actuator 33 to switch the connecting state of the gear train to the driving state D. The driving state D is the connecting state corresponding to an automatic driving mode, in which the gear train is automatically switched among the connecting states with different gear ratios. In the automatic driving mode, an electronic transmission control device (ECT-ECU) 35, which is connected to the SBW-ECU 31, controls the switching of the connecting state of the gear train depending on the vehicle traveling speed and the throttle opening size.

As long as normal functioning of the SBW-ECU 31 is maintained, the SBW-ECU 31 supplies the permitting switch 22 with a drive signal for opening the contact of the permitting switch 22. Thus, the contact of the permitting switch 22 is normally maintained in an open state. Accordingly, during the normal functioning of the SBW-ECU 31, the gas generating device 15 remains inactivated even if the releasing switch 21 is depressed. In contrast, if the normal functioning of the SBW-ECU 31 is hampered by, for example, insufficient battery voltage, the supply of the drive signal to the permitting switch 22 is stopped. This closes the contact of the permitting switch 22 and places the gas generating device 15 in a waiting state. In this state, if the releasing switch 21 is depressed, the gas generating device 15 is actuated. In other words, the permitting switch 22 functions as an in actuation permitting means, which permits or prohibits the actuation of the ignition drive device 2 based on the manipulation of the releasing switch 21.

Accordingly, the first embodiment has the following effects.

(1) When the releasing switch 21 is manipulated, the gas generating device 15 of the ignition drive device 2 is actuated. This generates gas in the ignition drive device 2. The pressure of the gas moves the rod 13 such that the parking lock member 18 shifts from a parking lock position to a releasing position. In other words, the manipulation of the releasing switch 21 releases the parking lock of the transmission 17. Thus, even when the controlling of the transmission 17 by the SBW-ECU 31 is hampered, the parking lock state of the transmission 17 can be changed to the release state.

(2) The operator is allowed to release the parking lock of the transmission 17 simply by manipulating the releasing switch 21. The parking lock state of the transmission 17 is thus easily changed to the release state.

(3) Regardless of the manipulation of the releasing switch 21, the gas generating device 15 remains inactivated unless the contact of the permitting switch 22 is closed. As long as the normal functioning of the SBW-ECU 31 is maintained, the contact of the permitting switch 22 remains open. This reliably prevents the gas generating device 15 from being actuated even if the releasing switch 21 is erroneously manipulated during the normal functioning of the SBW-ECU 31. Accordingly, erroneous actuation of the ignition drive device 2 is further reliably prevented.

(4) Since the releasing switch 21 is located in the passenger compartment, the releasing switch 21 is easy to manipulate. Further, the releasing switch 21 is normally covered by the cover 24. This reliably prevents the releasing switch 21 from being erroneously manipulated.

A second embodiment of the present invention will hereafter be described with reference to FIG. 5. The description focuses on the difference between the first embodiment and the second embodiment. Same or like reference numerals are given to parts in FIG. 4 that are the same as or like corresponding parts in FIG. 5. The description of these parts is omitted.

Figure 5:
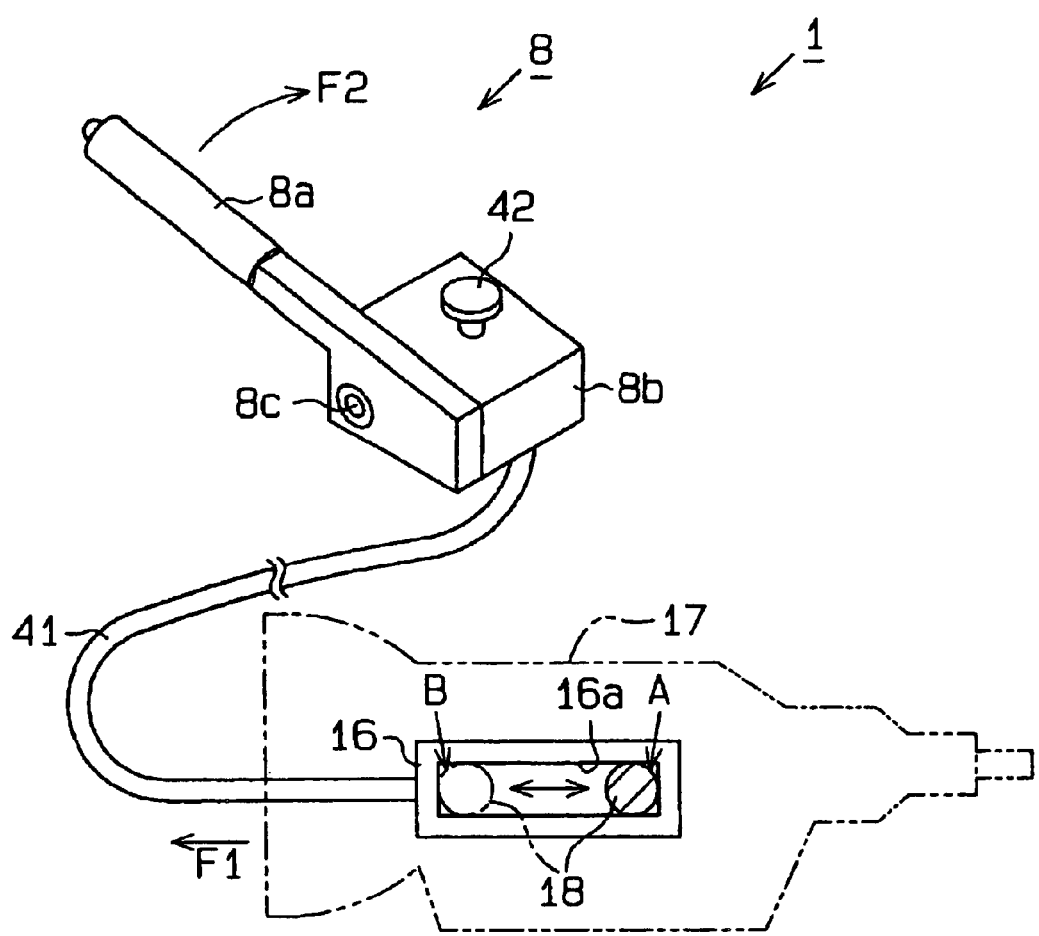
FIG. 5 is a view showing a parking lock state releasing apparatus of a second embodiment of the present invention.

With reference to FIG. 5, in the second embodiment, the parking lock state releasing apparatus 1 includes a parking brake lever 8, which is a conventional movable member provided in the passenger compartment, and the releasing ring 16, and a releasing wire 41 as a power transmitting member.

A proximal end of the releasing wire 41 is connected to the releasing ring 16. A distal end of the releasing wire 41 is connected to the parking brake lever 8. More specifically, the parking brake lever 8 includes a lever body 8a. The lever body 8a is supported by a support 8b. The distal end of the releasing wire 41 is connected to the support 8b.

The lever body 8a is pivotal about the support 8c of FIG. 5 in the direction indicated by the arrow F2. The lever body 8a is normally connected to a non-illustrated brake wire. When the lever body 8a is manipulated, the brake wire is also operated. More specifically, when the lever body 8a is manipulated, the lever body 8a functions as a lever. This amplifies the manipulating force, which is then transmitted to the brake wire. The brake wire is thus operated by the amplified force, which acts as drive force, to cause the parking brake.

A switch 42 is formed in the support 8b. The switch 42 switches the connecting state of the lever body 8a between connection between the lever body 8a and the brake wire and connection between the lever body 8a and the releasing wire 41. When the switch 42 is manipulated to connect the lever body 8a to the releasing wire 41, the releasing wire 41 operates in accordance with the manipulation of the lever body 8a. More specifically, when the lever body 8a is manipulated in the direction of the arrow F2, the manipulation force is amplified and is applied to the releasing wire 41. The releasing wire 41 is then operated by the amplified force as drive force, such that the proximal end of the releasing wire 41 moves in the direction of the arrow F1. This moves the releasing ring 16 in the direction of the arrow F1. Thus, even if the parking lock member 18 is located at the lock position (the position A), the movement of the releasing ring 16 forcibly moves the parking lock member 18 to the releasing position (the position B). That is, the parking lock state of the transmission 17 is changed to the release state.

In the present embodiment, the switch 42 is permitted to operate only when normal functioning of the SBW-ECU 31 is hampered. More specifically, a solenoid is located in the vicinity of the switch 42. During the normal functioning of the SBW-ECU 31, a drive signal is outputted to the solenoid. When the solenoid is excited, the rod of the solenoid is engaged with the switch 42 to prohibit the operation of the switch 42. In contrast, when the solenoid is non-excited, the rod of the solenoid is released from the switch 42 to permit the operation of the switch 42.

Accordingly, the present embodiment has the following effects.

(5) The switch 42 connects the lever body 8a of the parking brake lever 8 to the releasing wire 41. In this state, if the lever body 8a is operated, the releasing wire 41 is driven by the operation force of the lever body 8a. The drive force of the releasing wire 41 then changes the parking lock state of the transmission 17 to the release state. Thus, even when the controlling of the transmission 17 by SBW-ECU 31 is hampered, the parking lock state of the transmission 17 is changed to the release state.

(6) The distal end of the releasing wire 41 is connected to the parking brake lever 8, which is a conventional movable member provided in the vehicle 4. It is thus unnecessary to form an additional component for driving the releasing wire 41. This structure reduces the number of the parts needed for forming the parking lock state releasing apparatus 1.

(7) Since the lever body 8a of the parking brake lever 8 functions as a lever, the operation force that acts on the lever body 8a is amplified before being transmitted to the releasing wire 41. It is thus possible to change the parking lock state of the transmission 17 to the release state by a relatively small force. Accordingly, the parking lock state of the transmission 17 is easily changed to the release state.

The illustrated embodiments of the present invention may be modified as follows.

In the first embodiment, the driver circuit 3 includes the permitting switch 22. This prevents the ignition drive device 2 regardless of the operation of the releasing switch 21 as long as the normal functioning of the SBW-ECU 31 is maintained. However, the permitting switch 22 may be omitted. Even in this case, the cover 24, which normally covers the releasing switch 21, prevents the releasing switch 21 from being erroneously manipulated.

Further, in the first embodiment, the ON/OFF controlling of the permitting switch 22 is based on an output signal from the SBW-ECU 31. That is, the permitting switch 22 is electrically controlled. However, the permitting switch 22 may be, for example, a push-button switch located in the passenger compartment (for example, in the steering column). In this case, the ignition drive device 2 is activated when the operator manipulates the permitting switch 22 and the releasing switch 21.

Figure 6:
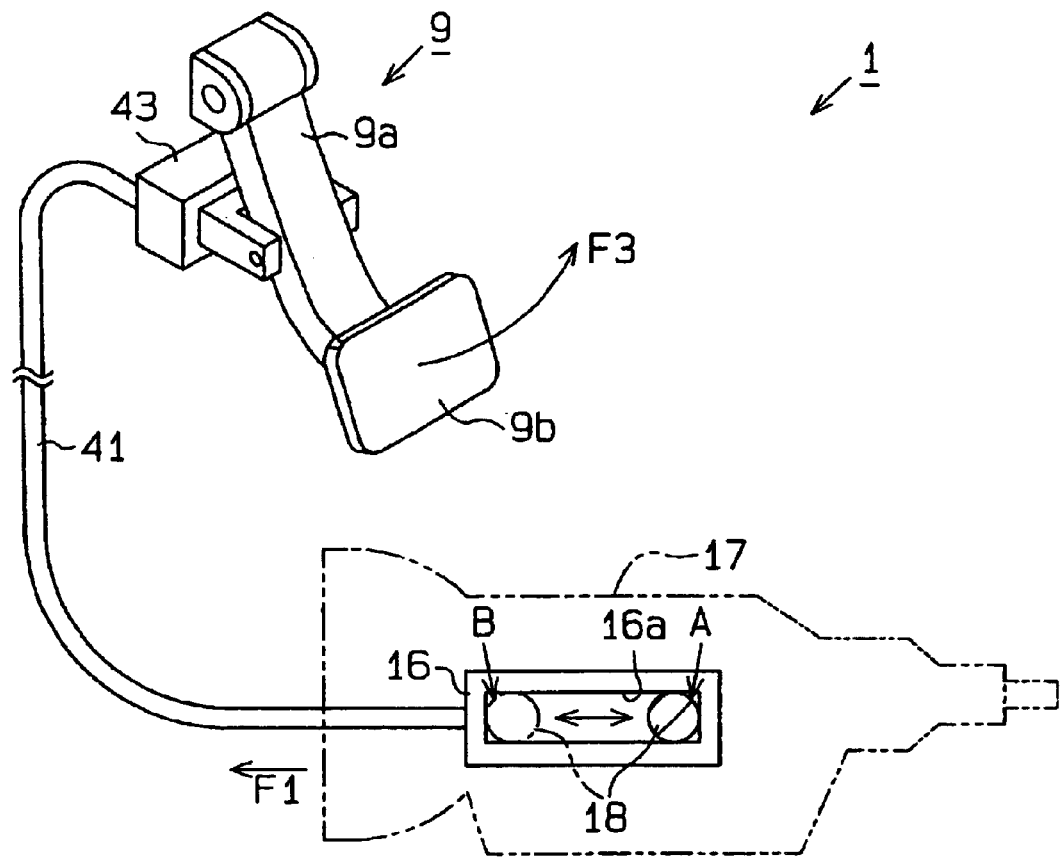
FIG. 6 is a view showing a parking lock state releasing apparatus of another embodiment of the present invention.

In the second embodiment, the distal end of the releasing wire 41 is connected to the parking brake lever 8. Instead, for example, with reference to FIG. 6, an engaging member 43 may be connected to the distal end of the releasing wire 41. The engaging member 43 can be engaged with a lever 9a of a brake pedal 9, which is a conventional movable member located in the passenger compartment. The engaging member 43 is engaged with the lever 9a when the transmission 17 is in the parking state P and the normal functioning of the SBW-ECU 31 is hampered. When a pedal 9b of the brake pedal 9 is moved in the direction indicated by the arrow F3 of FIG. 6 with the engaging member 43 engaged with the lever 9a, the releasing wire 41 follows the movement of the pedal 9b and moves in the direction indicated by the arrow F1. In this case, the same effects as those of the second embodiment can be obtained. Further, the engaging member 43 does not necessarily have to be connected to the brake pedal 9 but may be connected to other foot pedals, such as an accelerator pedal.

Figure 7:
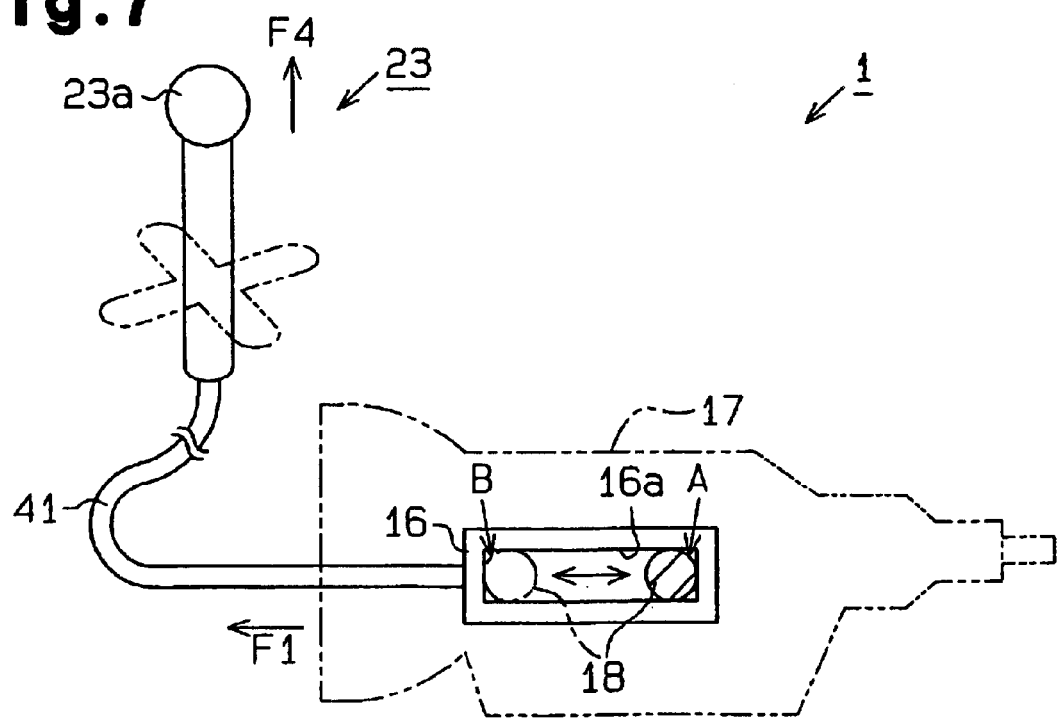
FIG. 7 is a view showing a parking lock state releasing apparatus of another embodiment of the present invention.

In the second embodiment, the distal end of the releasing wire 41 is connected to the parking brake lever 8. Instead, for example, as shown in FIG. 7, the distal end of the releasing wire 41 may be connected to a proximal portion of the manipulator 23a of the shifting body 23. In this case, when the manipulator 23a is moved in the direction indicated by the arrow F4 of FIG. 7, the releasing wire 41 follows the movement of the manipulator 23a to move in the direction of the arrow F1. Even in this structure, the same effects as the effects (5) and (6) of the second embodiment can be obtained.

In the second embodiment, the distal end of the releasing wire 41 is connected to the parking brake lever 8. However, for example, a hook may be formed at the distal end of the releasing wire 41, while an engaging portion that engages with the hook is formed at a door adjacent to the driver seat. In this case, when the door is opened with the hook engaged with the engaging portion, the parking lock state of the transmission 17 is changed to the release state. Further, in this case, the door functions as a lever such that the parking lock state of the transmission 17 is changed to the release state by small force. Particularly, since force is easily applied to the door, the parking lock state of the transmission 17 can be further easily changed to the release state.

In each of the illustrated embodiments, the parking lock state releasing apparatus 1 releases the parking lock of the transmission 17. However, the parking lock state releasing apparatus 1 may switch the connecting state of the transmission 17 to the range "D" or the range "R". Further, the power transmitting member does not necessarily have to be the releasing wire 41 but may be, for example, a link mechanism.

What is claimed is:

1. A parking lock state releasing apparatus for a vehicle with a transmission control device, wherein the transmission control device has a shifting body and detects an operating state of the shifting body, wherein the transmission control device shifts a connecting state of a transmission based on the detection result, the apparatus comprising:

a parking lock member, which is located in the transmission, wherein the parking lock member mechanically locks wheels of the vehicle by means of the transmission;

a power transmitting member, wherein the power transmitting member has a proximal end connected to the parking lock member of the transmission and a distal end connectible to a conventional movable member provided in the vehicle; and a switch, which connects the movable member to the power transmitting member when manipulated;

wherein the power transmitting member is driven in response to operation of the movable member when the movable member is connected to the power transmitting member by the switch, and the parking lock state of the transmission is changed to the release state in accordance with the driving of the power transmitting member, wherein the switch can only be manipulated when normal functioning of the transmission control device is hampered.

2. A parking lock state releasing apparatus for a vehicle with a transmission control device, wherein the transmission control device has a shifting body and detects an operating state of the shifting body, wherein the transmission control device shifts a connecting state of a transmission based on the detection result, the apparatus comprising:

a parking lock member, which is located in the transmission, wherein the parking lock member mechanically locks wheels of the vehicle by means of the transmission;

a power transmitting member, wherein the power transmitting member has a proximal end connected to the parking lock member of the transmission and a distal end connectible to a movable member provided in the vehicle; and a switch, which connects the movable member to the power transmitting member when manipulated;

wherein operation force of the movable member is amplified by a lever effect when the movable member is connected to the power transmitting member by the switch and the movable member is operated, the power transmitting member is driven by the amplified force, and the parking lock state of the transmission is changed to the release state by the power transmitting member, wherein the switch can only be manipulated when normal functioning of the transmission control device is hampered.

* * * * *